Jan. 13, 1959  R. C. BOUGHTON  2,868,576
GASKET FOR BELL AND SPIGOT PIPE JOINTS
Original Filed Feb. 6, 1950
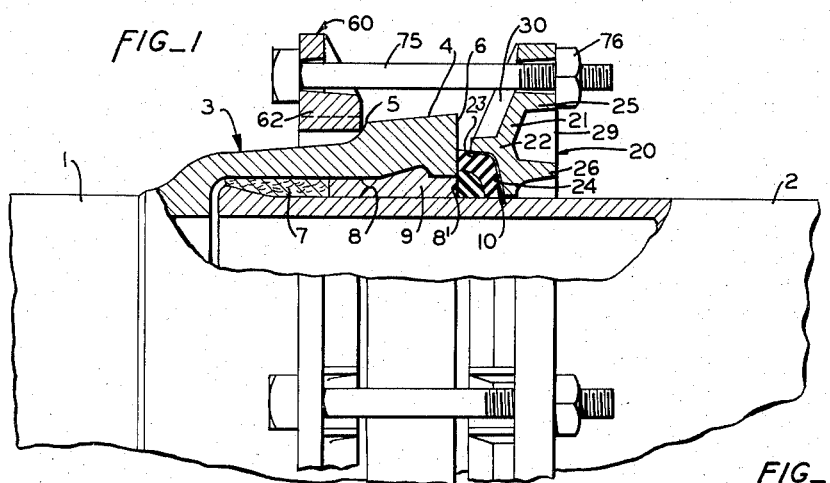
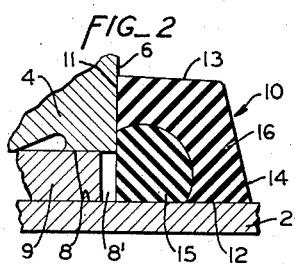
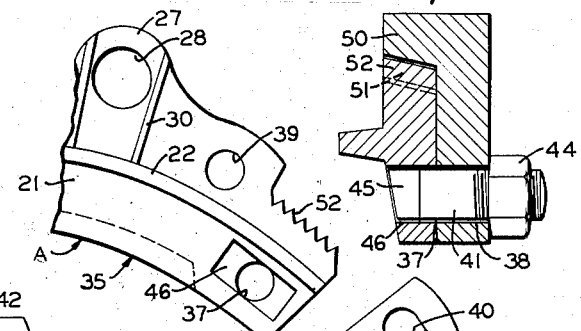
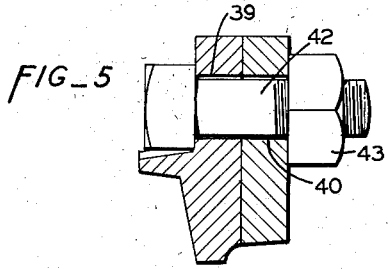
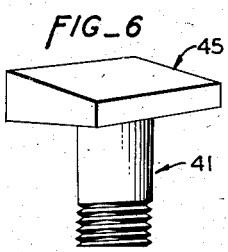
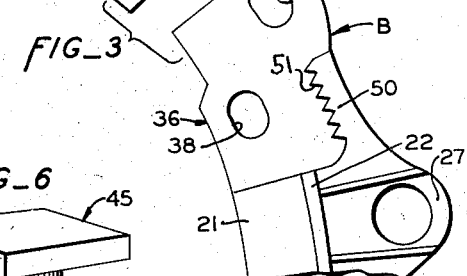
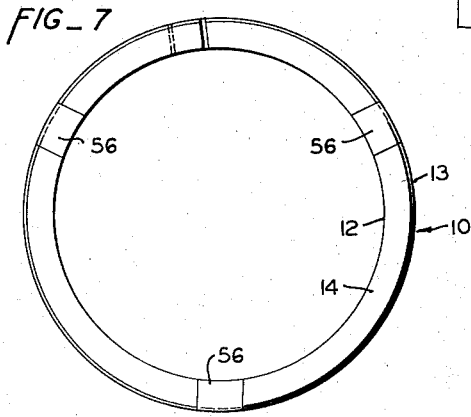
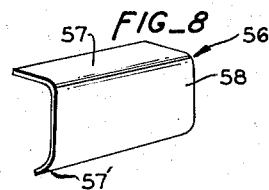
INVENTOR.
ROGER C. BOUGHTON
BY
ATTORNEYS

United States Patent Office 2,868,576
Patented Jan. 13, 1959

2,868,576

GASKET FOR BELL AND SPIGOT PIPE JOINTS

Roger C. Boughton, Alhambra, Calif.

Original application February 6, 1950, Serial No. 142,675. Divided and this application March 12, 1957, Serial No. 645,482

2 Claims. (Cl. 288—33)

This application is a division of application Serial No. 142,675, filed February 6, 1950, and now abandoned, relates to gasket construction, particularly a construction adapted for use in a clamp for sealing the annular opening between the pipes in a bell and spigot joint.

A bell and spigot joint is normally sealed at the time the pipe is made up by inserting oil impregnated oakum and lead into the annular spaces between the spigot pipe and the bell of the joint. After a period of time such joints tend to leak, partly due to the drying out of the oakum and partly due to loosening of the lead and it becomes necessary to re-seal the joint without disconnecting the pipe. When the pipe is employed to convey gas, the tendency to dry out is particularly great and it is in connection with gas pipes that the present invention is particularly useful.

In cases, such as above described, it is desirable that a gasket be used for sealing the opening through which leakage occurs, and that such gasket be sufficiently resilient and yieldable to positively prevent the escape of the gas and at the same time be of sufficient hardness that "cold flow" is prevented. Prior attempts to overcome "cold flow" of the gasket by providing means for restraining the gasket around its exterior surfaces are generally such as shown in my United States Letters Patent No. 2,078,876 of April 13, 1937. Such devices have, for the most part, been satisfactory, but require additional elements in cooperation with the spigot ring.

One of the objects of the present invention is the provision of an improved gasket comprising two integrally connected portions of resilient material adapted to seal the joint and in which gasket a soft portion thereof extends across the opening to be sealed and a relatively hard portion thereof abuts the face of a bell and the spigot pipe. The softer portion thus acts to seal the opening and the harder portion is for resisting the "cold flow" above mentioned.

Another object of the invention is the provision of a gasket of the above described character in combination with a sectional clamp for pipes of larger sizes.

Other objects and advantages will appear in the description and in the drawings.

In the drawings,

Fig. 1 is a fragmentary part elevational and part sectional view of a coupling on the bell and spigot ends of pipe.

Fig. 2 is an enlarged sectional view through a gasket at the bell and spigot ends before the clamping rings are in position.

Fig. 3 is an enlarged elevational fragmentary view of the adjacent ends of an adjacent pair of segments of the spigot clamping ring with said ends separated for clarity.

Fig. 4 is an enlarged cross sectional view of the connected adjacent ends of the spigot ring at one of the connecting bolts.

Fig. 5 is an enlarged cross sectional view of the connected ends of the spigot ring at another of the connecting bolts.

Fig. 6 is an enlarged view of one of the bolts for securing together the segments of the spigot ring.

Fig. 7 is a reduced size elevational view of the gasket having bridging pieces thereon.

Fig. 8 is a perspective view of one of the bridge pieces.

This invention is adapted to be employed with a conventional bell and spigot joint for connecting pipes 1 and 2 (Fig. 1). The pipe 1 is provided with a bell end generally designated 3, for receiving the end of the spigot pipe 2. The bell 3 is usually provided with a radially outwardly projecting ridge 4 adjacent to but spaced from the terminating annular free end edge of the bell, which ridge forms a shoulder 5 for engagement with a portion of an annular clamping member to be described later on more in detail.

The bell 3 terminates in an annular axially facing surface 6.

When the joint is originally made, the end of pipe 2 is inserted into the bell 3 and a ring 7 of oakum is usually inserted and caulked and lead 9 substantially fills the remainder of the space 8 up to the surface 6, as shown in Fig. 1.

In the present invention, an annular gasket 10 is provided, which gasket is adapted to surround the spigot pipe 2 and to engage the end surface 6 of bell 3 (Figs. 1, 2). The gasket 10 has an annular axially facing surface 11 for engaging the face 6 of the bell and for filling the open end 8' of space 8 through which leakage may occur. Adjacent to the surface 11 and in engagement with the outer side of spigot pipe 2 is a cylindrical, radially inwardly facing surface 12 (Fig. 2) on gasket 10, which surface is at right angles to surface 11, and opposite to the spigot engaging surface 12 of the gasket is a radially outwardly facing surface 13 somewhat shorter in width (axially of the gasket) than surface 12. This surface 13 is inclined radially inwardly toward the axis of the gasket in direction away from bell 3 to form a generally frusto-conical outer surface on the gasket. Opposite to the bell engaging surface 11, the gasket is formed to provide an axially directed surface 14 that connects with the surface 13 and with surface 12, which surface 14 is somewhat of less width (radially of the gasket) than surface 11 due to the inclination of surface 13. Also the surface 14 is slightly inclined from its outer edge in direction away from surface 11, therefore surface 12 is of greater width axially of the gasket than surface 13.

The gasket 10, as seen in Fig. 2, comprises two annular portions 15, 16 of resilient material, such as rubber, which are integrally united. Portion 15 is the inner corner portion, and is approximately half round in cross sectional contour. Two of the sides of said inner corner portion 15 are portions of the radially and axially facing surfaces 11, 12 that join each other at right angles and that extend from the juncture of said surfaces to points intermediate the axial and radial dimensions of the gasket at a side thereof. The remainders of the surfaces 11, 12 outwardly of the corner portion 15 define two of the sides of the outer corner portion, and the arcuate line of division between the inner corner portion 15 and the outer portion 16, is developed about a center that is on a line substantially bisecting the right angle defined by the surfaces 11, 12 and disposed within said inner corner portion. Thus, in cross sectional contour, the above arcuately extending line will extend between the points along surfaces 11, 12 that define the junctures between the portions thereof that form two of the sides of the inner corner portion 15 and the outer portion 16, and said line will meet said surfaces at acute angles relative to the portions forming the said two sides of said outer portion. This is particularly important with respect to the radially inwardly facing surface of said outer portion, as will later appear.

In connection with the above, it is important that the inner corner portion 15 is softer than the outer portion 16. Preferably the inner corner portion has a durometer hardness of approximately 50. In normal practice, the lead 9 is usually flush with the surface 6 of the bell of pipe 1, but where there is a space, such as at 8' (Fig. 2) the material of portion 15 of the gasket will completely fill this space when the bell clamp ring and the spigot clamp ring are tightened to draw the gasket tightly against surface 6. Heretofore this filling of space 8' has not occurred, but instead, the gasket merely bulges to a limited extent into said space 8'. Should the width of space 8' in direction axially of the pipe be greater than say one eighth of an inch, it is usually filled with some material, such as plaster of paris before the gasket is tightened. Otherwise, the possibility of engagement between the bell 3 and the spigot ring of the clamp would exist, with the possible result of limiting the sealing effect of the gasket. Also a hard or relatively hard gasket at the corner that extends across space 8' would not fill space 8' when the spigot and bell rings of the clamp are tightened.

The remainder 16 of gasket 10 is formed of relatively hard rubber, preferably of a durometer hardness of about 80 for resisting "cold flow." In cross section, portion 15 joins the remainder 16 along a curved surface as shown in Fig. 2. This is highly desirable. It is pertinent to note that the portions 15, 16 of the gasket are molded and cured together so as to be inseparable and so that the resulting gasket is a unitary member.

It will be seen that the gasket 10 provides a relatively soft, yieldable portion extending across opening 8' of space 8 through which leakage has heretofore occurred. Furthermore, the remaining portion of the gasket which heretofore has been subject to "cold flow" is relatively hard to thereby resist the tendency to flow.

The spigot ring, generally designated 20, surrounds the spigot pipe 2 and is adapted to compress the gasket 10 between said ring and the face 6 of the bell when ring 20 is moved toward the bell.

Spigot ring 20 comprises a generally radially outwardly extending annular web 21 having an inner diameter slightly larger than the outside diameter of the spigot pipe 2.

A circular flange 22 integral with web 21 extends axially of web 21 toward bell 3 when the spigot ring 20 is in position as shown in Fig. 1, therefore ring 20 will provide a pair of gasket engaging walls 23, 24. On the side of the web 21 opposite to flange 22 are radially spaced circular flanges 25, 26 which stiffen the web 21 against bending.

Radially outwardly extending projections 27 (Fig. 3) are integral with the web 21 and each of these projections is formed with a hole 28 for a bolt that connects the spigot ring with a clamping ring on the bell, as will later be described. Ribs 29 on the side of web 21 opposite to flange 22 also reinforce web 21, which ribs extend radially of the ring 20 at opposite sides of each hole 28, and similar ribs 30 on the opposite side of web 21 are also at opposite sides of each hole 28.

The spigot ring 20 is preferably made up of a plurality of arcuate segments adapted to be secured together at the adjacent ends of each adjacent pair of segments. The adjacent ends of an adjacent pair of segments are shown in Fig. 3, and these ends are adapted to be releasably secured together in overlapping relation to form a joint.

A circumferentially extending extension 35 at one end of web 21 on each segment (Fig. 3) is adapted to overlap a complementarily formed extension 36 at the end of the web 21 of the adjacent segment of ring 20. These extensions 35, 36 are formed so that the gasket engaging flange 22 is substantially continuous at each joint.

Extension 36 is provided with a hole 38 that is elongated circumferentially of the segment or ring 20, and such hole 38 is adapted to register with a hole 37 formed in extension 35. A bolt 41 (Figs. 4, 6) is adapted to extend through each registering pair of holes 37, 38.

A second hole 39 is formed in extension 35, but radially outwardly of flange 22, and a hole 40 is formed in extension 36 for receiving bolt 42 (Fig. 5). This hole 40 is elongated circumferentially of the segment or ring 20, and the bolt holes 39, 40 are preferably spaced both radially outwardly of ring 20 and circumferentially thereof relative to holes 37, 38 to provide the greatest resistance against twisting of the adjacent segments relative to each other. Holes 39, 40 are, of course, in registration when holes 37, 38 are in registration.

Upon tightening each bolt 42 by means of a nut 43 on said bolt and upon tightening each bolt 41 by means of a nut 44 thereon the extensions 35, 36 are rigidly and releasably secured together.

To prevent interference of bolt 41 with gasket 10, the head 45 (Fig. 6) of bolt 41 is elongated and rectangular to fit within a correspondingly shaped elongated rectangular recess 46 (Fig. 3) in the side of each extension 35. The top or outer surface of head 41 is inclined relative to the axis of the bolt to conform to the inclination of the gasket engaging surface of wall 24 of web 21, which latter surface is slanted to conform to the slant of the surface 14 of the gasket.

Since the pressure between the gasket and the spigot ring becomes very great, it is desirable that bolt head 45 fit snugly in depression 46 and that the slanted outer end of the head be coplanar unto the gasket engaging surface of wall 24. By shaping the bolt head 45 as shown, a minimum amount of metal can be used without objectionably weakening the head, and also the bolts will not rotate on their axes when the nuts are tightened.

The thickness of extension 36 is increased adjacent to its outer edge to provide an axially projecting or raised elongated portion 50 extending to a point approximately centrally of the length of extension 36. This portion 50 is provided with a circumferentially extending radially inwardly projecting row of teeth 51 which are adapted to mesh with a corresponding row of radially outwardly projecting teeth 52 formed in extension 35. A portion of the extension 35 is removed, as shown in Fig. 4, to permit the raised portion 50 to lie in radially overlying relation to extension 35. This engagement between teeth 51, 52 prevents separation of adjacent pairs of segments when the extensions are secured together by bolts 41, 42. Also this structure enables adjusting the diameter of ring 20 to accommodate the ring to variations in pipe sizes.

In the event there are slight gaps or cracks along the gasket engaging sides of walls 23, 24 at the junctures between the adjacent pairs of segments, bridge pieces 56 may be secured to the gasket (Fig. 7) to bridge these cracks. Such bridge pieces have angular disposed sides 57, 58 to overlie and to conform with the outer contiguous surfaces 13, 14 of the gasket and may be retained in place on the gasket by being positioned in the gasket mold during the molding operation so they are substantially integral with the gasket. Such bridge pieces may be of aluminum, brass, steel etc.

Gasket 10 may be cut through at any desired point between the bridge pieces so that it may be placed around a pipe. This cut is preferably started at the surface which engages the spigot ring and continues through the gasket at one side thereof at an angle of about 30° relative to the plane in which the gasket is disposed to facilitate fitting the ends of the gasket together in lapping relation at the cut. The length of the gasket may be reduced to suit a smaller pipe by removing a portion from one of its ends by cutting along a plane parallel with the plane of the original cut. Also, each bridge piece may have a relatively narrow flange 57' along the free edge of portion 58.

By the foregoing structure of ring 20 there is no weakness at the gaps that may exist between the adjacent ends of adjacent pairs of segments.

The bell ring, generally designated 60 (Fig. 1) may also be made up of segments bolted together and having bolt openings adapted to register with the openings 28 in ring 20. This ring 60 is provided with spaced lugs 62 adapted to engage the shoulder 5 on bell 3 and headed bolts 75 are adapted to extend through the registering openings in the bell and spigot clamping rings. A nut 76 on the end of each bolt may engage the lugs 27 on ring 20 while the head of each bolt engages ring 60. Upon tightening the nuts, the ring 20 will be drawn toward ring 60 and the gasket will be brought into tight sealing engagement with surface 6 of the bell 3 and the soft portion 15 of the gasket will not only extend across the space 8 and into engagement with said surface 6, but it will fill the gap 8' and will be in sealing engagement with the spigot pipe.

Insofar as the gasket is concerned, it is important that the relative soft corner portion 15 extend along the outer surface of pipe 2 and across the open end of space 8, as above described, and it is also important that the harder portion 16 engage both the outer surface of pipe 2 and the flat, axially facing surface 6 of bell 4. The external contour of the gasket, such as the angularly directed adjacent sides 13, 14, is preferably as illustrated, but it may be varied, provided the gasket is so formed that the flange 22 does not engage the face 6 when bolts 75 are tightened to effect a seal, irrespective of whether space 8' exists. As pointed out, where this space 8' does exist, it is relatively shallow, and if deep, it is preferably substantially filled with a filler of some kind or other. However, the lead 9 never projects beyond the face 6 of the bell, and the ideal situation is one in which the axially facing surface of the lead, or filler, is flush with surface 6.

One highly desirable feature of the invention is the fact that the center about which the half round contour of the soft inner corner portion 15 is developed is not at the inner corner of said portion but about a center that is within said portion so that the intersection between the straight surface 12 (in cross sectional contour) and the circular outer surface of portion 15 will define an acute angle having the apex or point directed generally toward the inner right angle corner of portion 15. When the spigot ring is tightened against the gasket, the "point" of relatively hard rubber at the intersection of the surface 12 and the circular contour of the portion 15 that is integrally connected with said portion 15 positively insures against the inner surface 12 of portion 16 lifting away from the spigot, as would otherwise occur. The slanted surface 13 also contributes to holding the surface 12 of the hard outer portion 16 against the spigot pipe when the spigot ring is tightened.

Inasmuch as the rubber of the gasket is incompressible it will be seen that the prevention of cold flow of the portion 16 while applying sufficient pressure against the soft portion 15 to build up energy in distortion under pressure sufficient to maintain a tight seal in the event of a loosening of the joint, is essential to the accomplishment of the desired and necessary result. If "cold flow" were permitted, as would occur were the entire gasket of the softness of portion 15, then said energy would be lost and a leak would occur upon any loosening in the joint, and such loosening is frequent. It is believed to be apparent, in view of the foregoing explanation, that two separable rubber gaskets of different degrees of hardness would be inoperative for accomplishing the desired results.

I claim:

1. An annular gasket of rubber and the like for a bell and spigot pipe joint of the type that includes a gasket engaging spigot ring around the spigot end of one pipe of the joint; said gasket having, in cross sectional contour, an inner corner portion and an outer portion and a radially inwardly facing surface adapted to engage the outer periphery of such spigot end and an axially facing surface adapted to engage the axially facing surface of the bell of such joint, said radially facing surface and said axially facing surface of said gasket joining each other at right angles, said inner corner portion having two sides that are defined by the portions of said radially inwardly and axially facing surfaces of said gasket extending from their juncture to points intermediate the axial and radial dimensions of said gasket at a side thereof, said outer portion having two sides that are respectively in axial and radial continuation of the radially and axially facing sides of said inner corner portion in directions away from said juncture, said inner corner portion being relatively soft and distortable under pressure and the outer portion between the said two sides thereof extending around said inner corner portion and being substantially harder than said inner corner portion, said inner corner portion and said outer portion, in cross sectional contour, being integrally united along a generally circularly extending line extending between said points and developed about a center positioned within said inner corner portion on a straight line extending from said juncture and substantially bisecting said inner corner portion whereby said two sides of said outer portion and said circularly extending line will define acute angles at said points having their apices directed generally toward said juncture between the radially and axially facing surfaces of said inner corner portion.

2. An annular gasket of rubber and the like for a bell and spigot pipe joint that includes a gasket engaging spigot ring; said gasket having, in cross sectional contour, an inner corner portion and an outer portion and a radially inwardly facing surface adapted to engage the spigot of such joint and an axially facing surface adapted to engage the axially facing surface of the bell of such joint, said radially facing surface and said axially facing surface joining each other at right angles, said inner corner portion having two sides that are defined by the portions of said radially inwardly and axially facing surfaces of said gasket extening from their juncture to points intermediate the axial and radial dimensions of said gasket at a side thereof, said outer portion having two sides that are respectively in axial and radial continuation of the radially and axially facing sides of said inner corner portion in directions away from said juncture, said inner corner portion having a durometer hardness of approximately 50 and said outer corner portion having a durometer hardness of approximately 80, said outer portion between said two sides thereof extending around said inner corner portion and being, in cross sectional contour, integrally joined along an arcuately extending line extending between said points and meeting said radially inwardly facing surface at an acute angle relative to the radially inwardly facing side of said outer portion having its apex directed generally toward said juncture between the radially and axially facing surfaces of said inner corner portion.

References Cited in the file of this patent

UNITED STATES PATENTS

| | | |
|---|---|---|
| 1,948,274 | McMurray | Feb. 20, 1934 |
| 1,994,527 | Merrill | Mar. 19, 1935 |
| 2,079,731 | Clark | Nov. 3, 1936 |
| 2,114,771 | Turner | Apr. 19, 1938 |
| 2,365,046 | Bottomley | Dec. 12, 1944 |
| 2,386,873 | Mercier | Oct. 16, 1945 |
| 2,417,494 | Hoof | Mar. 18, 1947 |
| 2,427,789 | Kehle | Sept. 23, 1947 |
| 2,621,885 | Schmitt | Dec. 16, 1952 |